(12) United States Patent
Fowler et al.

(10) Patent No.: US 6,690,562 B2
(45) Date of Patent: Feb. 10, 2004

(54) LIGHTING SUPPRESSION SYSTEM FOR CONTROL OR INSTRUMENTATION CABLE

(76) Inventors: William J. Fowler, 2162 Gulf Terminal Dr., Houston, TX (US) 77023;
Benjamin P. Fowler, 2162 Gulf Terminal Dr., Houston, TX (US) 77023

(*) Notice: Subject to any disclaimer, the term of this patent is extended or adjusted under 35 U.S.C. 154(b) by 219 days.

(21) Appl. No.: 09/882,686

(22) Filed: Jun. 18, 2001

(65) Prior Publication Data
US 2002/0171991 A1 Nov. 21, 2002

Related U.S. Application Data

(63) Continuation-in-part of application No. 09/855,355, filed on May 15, 2001.

(51) Int. Cl.[7] ............................................... H02H 1/00
(52) U.S. Cl. ..................... 361/117; 174/2; 174/DIG. 17
(58) Field of Search ........................ 361/117–119, 212, 361/216, 217, 220; 336/61, 70, 90, 96, 186; 379/493, 451; 333/12, 81 R; 174/1–3, 6, 7, 17 R, 175 F, 25 R, 27, 32, 35 CE, 38, 50.52, 51, 92.1, 52.2, 98, 99 R, 130, DIG. 14, DIG. 17

(56) References Cited

U.S. PATENT DOCUMENTS

| | | | | |
|---|---|---|---|---|
| 1,138,186 A | * | 5/1915 | Brach | 174/6 |
| 3,380,004 A | * | 4/1968 | Hansen | 333/184 |
| 3,824,431 A | * | 7/1974 | Schlicke | 361/126 |
| 5,167,537 A | | 12/1992 | Johnescu et al. | 439/620 |
| 5,844,766 A | | 12/1998 | Miglioli | 361/119 |

* cited by examiner

Primary Examiner—Ronald W. Leja
(74) Attorney, Agent, or Firm—Harrison & Egbert

(57) ABSTRACT

A lightning suppression system including an instrument, a first cable electrically connected to the instrument, an enclosure having an interior volume, a first coil positioned within the enclosure and electrically interconnected to a first wire of the first cable, a second coil positioned within the enclosure and electrically interconnected to a second wire of the first cable, and an electronic device electrically interconnected by a second cable to the first and second coils. A conductive grit fills a portion of the enclosure around the first and second coils. A grounding rod is electrically connected by a conductive line to the enclosure.

17 Claims, 4 Drawing Sheets

LIGHTING SUPPRESSION SYSTEM FOR CONTROL OR INSTRUMENTATION CABLE

CROSS REFERENCE TO RELATED APPLICATIONS

The present application is a continuation-in-part of U.S. patent application Ser. No. 09/855,355, filed on May 15, 2001, and entitled "LIGHTNING SUPPRESSION ATTENUATOR AND SYSTEM EMPLOYING SAME", presently pending.

BACKGROUND OF THE INVENTION

1. Field of the Invention

The present invention relates to lightning suppression attenuators. More particularly, the present invention relates to lightning suppression systems for reducing the magnitude of current of the lightning current wavefront as it moves along an electrical line following a lightning strike. More particularly, the present invention relates to lightning suppression systems for protecting the instrumentation and control systems associated with control or instrumentation cable.

2. Description of Related Art

Lightning conceivably may have provided humankind with a first source of fire, but lightning has otherwise been a destructive force throughout human history. Strategies and apparatus for reducing the likelihood of damage by lightning are fairly old, including, for instance, lightning rods that have been use for approximately 200 years. While the use of such rods and other precautionary steps and safety devices reduce the damage and injury that would otherwise result from lightning today, it remains an enormously dangerous natural phenomenon that claims hundreds of lives worldwide every year and destroys a substantial amount of property. Somewhat paradoxically, advances in other areas of technology have increased, rather than diminished, the damaged caused by lightning. This is because relatively low voltage and current levels can damage integrated circuits and other modem electronic components, with the result that many electronic devices are more susceptible to lightning damage today than ever before. Many devices to which microprocessors technology has been added are more susceptible to lightning damage as a result of such improvements. Additionally, lightning is capable of inducing substantial currents not only in electrical circuits directly struck by it but also in circuits located within the magnetic field induced by a nearby lightning strikes, giving each strike enormous destructive potential.

Whenever lightning strikes a tower, an enormous amount of damage is created. Typically, the electronic device at the top of the tower is completely destroyed by the lightning. Furthermore, the structure of the tower and other associated electronics at the top of the tower can become damaged. Repair efforts on the tower are often time consuming and expensive. Typically, complete replacement of the electronic device at the top of the tower is required. As such, it is very important to develop a device which resists or prevents lightning strikes.

One of the most common areas of lightning strikes are outdoor facilities, such as chemical processing plants and refineries. These facilities often have large water towers, chemical towers and cracking towers extending a large distance above the earth. Other towers are often employed in such facilities. Conventionally, these facilities includes various control instruments, such as actuators and monitoring equipment associated with the processing associated with such towers. The elevated structures in such facilities include suitable electronic devices which serve to transmit or receive information. Since lightning follows the path of least resistance on its way to the earth, these elevated facilities are very attractive to lightning. It is well known that lightning is particularly attracted to areas of positive ions and is repelled by areas of negative ions. Since the electronic devices at the tops of these elevated facilities often operate on AC power, an attractive source of positive ions is generated at the top of the tower. The lightning wavefront will travel along the instrumentation or control cable associated with such elevated structures so as to cause damage downstream of the cable to the monitoring and control instrumentation located within the facility.

Whenever lightning actually strikes such an elevated structure, an enormous amount of damage is created. Typically, the electronic device at the top of the elevated structure is completely destroyed by the lightning. Additionally, those controls and monitoring equipment that are connected to such instruments will also be destroyed by virtue of the lightning wavefront traveling along the instrumentation and control cable. The replacement and repair of such electronic devices either on the elevated structure or in the facility is very expensive and time consuming. In certain circumstances, the destruction of such equipment will necessitate a complete dumping of the chemicals in process within the refinery or chemical processing plant. As such, it is very important to develop a device which minimizes damage cost by lightning strikes to such elevated structures or traveling along the instrumentation and control cable associated with such instruments.

In the past, various patents have issued relating to devices for preventing or suppressing the affects of such lightning strikes. For example, U.S. Pat. No. 5,694,286, issued on Dec. 2, 1997 to the present inventors, describes a lightning protection device. This device has a tower which is grounded to the earth, an electronic device mounted onto an area adjacent to the top of the tower, and a negative ion production device electrically connected to the area of the top of the tower. The negative ion production device serves to produce solely negative ions around and over the electronic device. An auger rod engages the earth so as to be conductively connected to the earth. An electrically line serves to connect the auger rod to the tower. A shield member is connected to the tower and extends over the electronic device.

U.S. Pat. No. 5,844,766, issued on Dec. 1, 1998 to L. Miglioli, describes a lightning suppression system for tower mounted antenna systems. This system includes a directional coupler, a quarter-wavelength stub, a first cylindrical capacitor, a second cylindrical capacitor and a lightning suppression circuit. The lightning suppression circuit suppresses high voltage direct current and low frequency signals such as those produced by near lightning strikes.

It is an object of the present invention to provide a lightning suppression attenuator that effectively prevents lightning strikes from damaging equipment connected to instrumentation and control cables.

It is another object of the present invention to provide a lightning suppression attenuator that minimizes the magnitude of a lightning current as it moves along the instrumentation and control cable.

It is a further object of the present invention to provide a lightning suppression attenuator that minimizes the damaging effects of lightning.

It is still a further object of the present invention to provide a lightning suppression attenuator which is easy to install, relatively inexpensive and easy to manufacture.

These and other objects and advantages of the present invention will be come apparent from a reading of the attached specification and appended claims.

BRIEF SUMMARY OF THE INVENTION

The present invention is a lightning suppression system comprising an instrument, a first cable having a first wire and a second wire connected to the instrument, an enclosure having an interior volume, a first coil positioned within the enclosure and electrically interconnected to the first wire, a second coil positioned within the enclosure and electrically interconnected to the second wire, and an electronic device electrically interconnected by a second cable to the first and second coils.

A conductive grit fills a portion of the enclosure around the first and second coils. In the preferred embodiment of the present invention, this conductive grit is steel shot. A rigid foam material can be affixed within the enclosure around the conductive grit and around the first and second coils. Each of the first and second coils has a central void with turns of wire extending around the central void. Each of the first and second coils has between 100 and 300 turns inclusive of wire extending around the central void.

A grounding rod is electrically connected by a conductive line to the enclosure. The grounding rod includes a central shaft, and a plurality of vanes extending radially outwardly from the central shaft. The central shaft and the plurality of vanes are formed of a conductive material. The conductive line connecting the grounding rod to the enclosure is a copper wire.

In one form of the present invention, the instrument can be a monitoring device and the electronic device is a display. In another form of the present invention, the instrument can be an actuator and the electronic device can be a controller. The first and second cables are generally of an identical structure. The second cable has a first wire interconnected to the first coil. The second cable having a second wire electrically interconnected to the second coil.

DETAILED DESCRIPTION OF THE INVENTION

Figure 1:
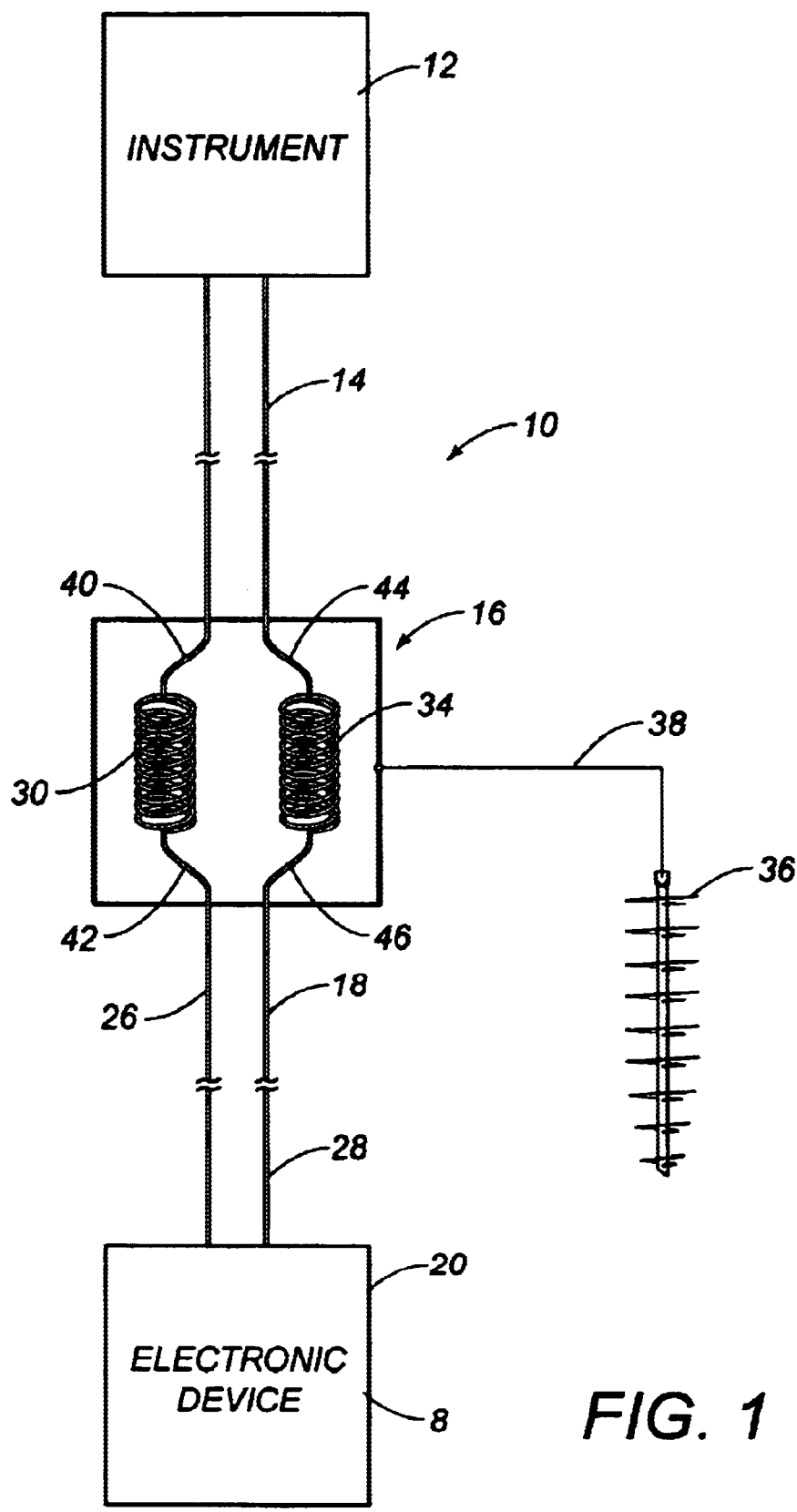
FIG. 1 is a diagrammatic illustration of the lightning suppression system of the present invention.

Referring to FIG. 1, there is shown the lightning suppression system 10 in accordance with the teachings of the present invention. The lightning suppression system 10 includes an instrument 12, a first cable 14 connected to the instrument 12, a lightning suppression attenuator 16 connected to an opposite end of the cable 14, a second cable 18 connected to the lightning suppression attenuator 16 at the opposite end from the first cable 14, and an electronic device 20. The first cable 14 has a first wire 22 and a second wire 24 therein. Similarly, the second cable 18 has a first wire 26 and a second wire 28 therein. The first wire 26 of the first cable 14 is electrically interconnected to a first coil 30 positioned within the interior of the enclosure 32 of the lightning suppression attenuator 16. The second wire 24 of the first cable 14 is electrically interconnected to a second coil 34 located within the enclosure 32 of the lightning suppression attenuator 16. The opposite end of the first coil 30 is connected to the first wire 26 of the second cable 18. The second coil 34 is electrically interconnected to the second wire 28 of the second cable 18. A grounding rod 36 is connected by a conductive line 38 to the enclosure 32 of the lightning suppression attenuator 16.

In the present invention, the instrument 12 can be any type of instrument that is located at the top of an elevated structure, such as a tower, a cracking tower, piping of a chemical processing plant or refinery, and chemical or water towers. The instrument 12 can be either a monitoring device (such as transducer) or an actuator (such as a remotely actuated valve). The electronic device 20 is electrically interactive with the instrument 12 so as to send control signals through the cables 14 and 18 to the instrument 12. The electronic device 20 can be either a controller or a display.

The cables 14 and 18 are generally of similar structure. For example, the cable 14 can be shielded or non-shielded. The wires 22 and 24 of cable 14 can be a straight or twisted pair of wires.

The lightning suppression attenuator 16 has its first coil 30 connected by a lead 40 connected to the first wire 22 and a lead 42 connected to the first wire 26. Similarly, the second coil 38 has a lead 44 connected to the second wire 24 and a lead 46 connected to the second wire 28. As will be described hereinafter, a conductive grit fills the interior of the enclosure 32 around the respective coils 30 and 34.

Figure 5:
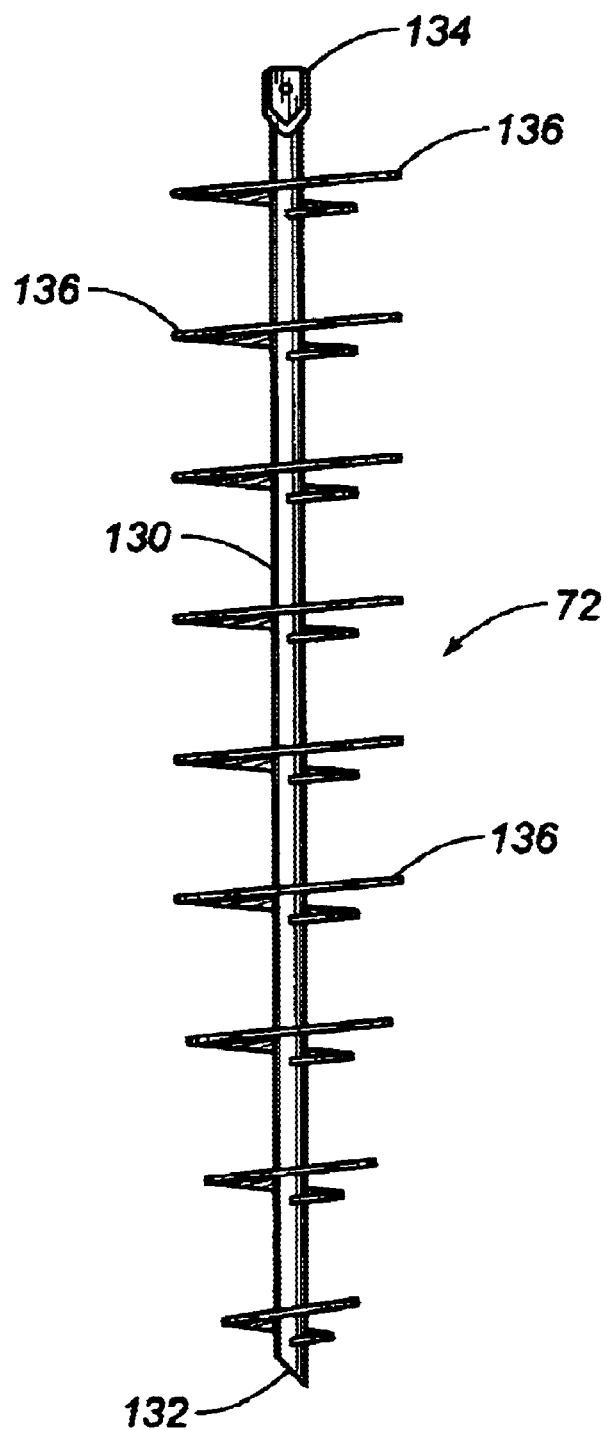
FIG. 5 is a side elevational view showing the grounding rod as used in the present invention.

The enclosure 32 is grounded by the connection of the conductive line 38 to the grounding rod 36. The conductive line 38 is #10 copper wire. Grounding rod 36 has a particular configuration, as illustrated in FIG. 5.

The use of the coils 30 and 34 within the lightning suppression attenuator 16 creates a counter EMF force in the respective coils 30 and 34. This counter EMF force will dissipate any current from the lightning wavefront passing in the form of heat. This heat is dissipated into the steel conductive grit on the interior of the enclosure 32. Any other charges associated with the lightning wavefront are dumped to ground along conductive line 38 and grounding rod 36. The present invention acts as a lightning "shock absorber". As such, the lightning suppression attenuator 16 will cushion in the effects of the lightning wavefront from adversely affecting or damaging the electronic device 20.

Figure 2:
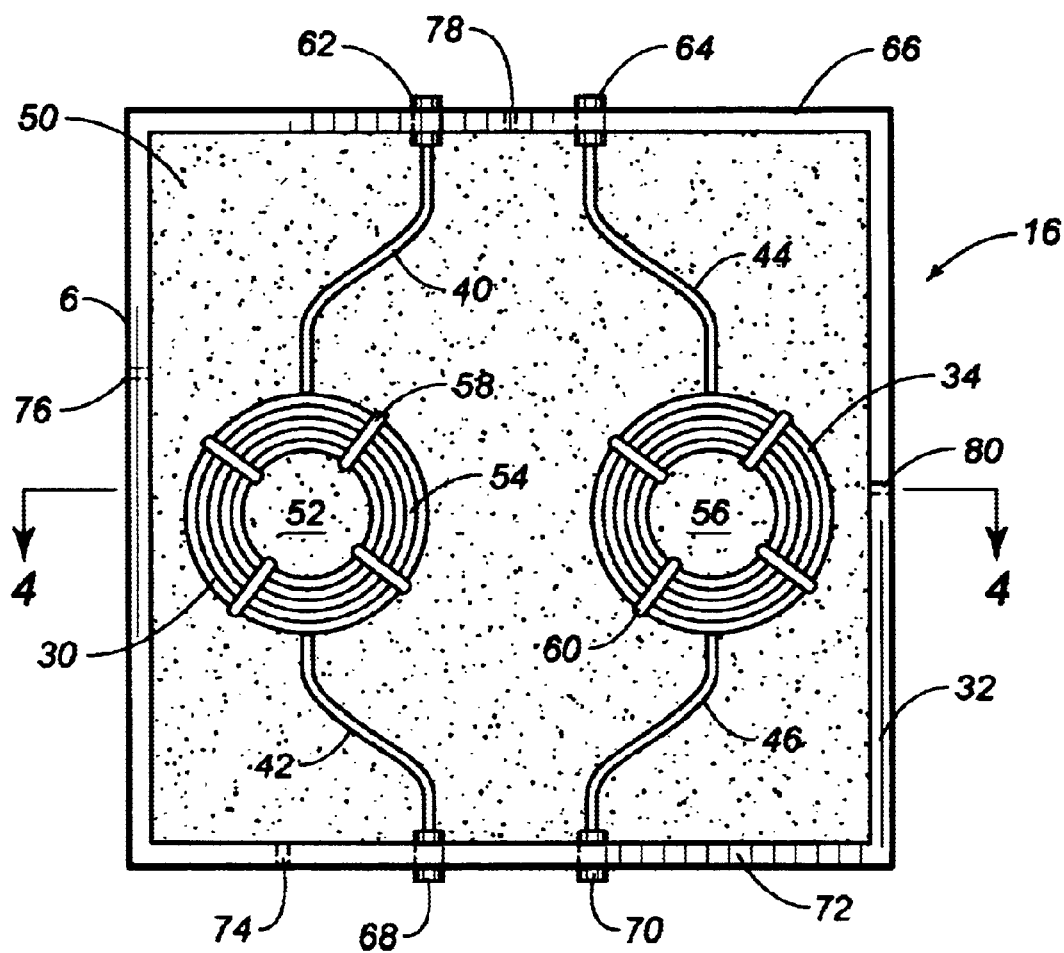
FIG. 2 is a plan view of the interior structure of the lightning suppression attenuator of the present invention.

FIG. 2 shows the interior of the lightning suppression attenuator 16. As can be seen in FIG. 2, coils 30 and 32 are positioned within the conductive grit 50 contained within the enclosure 32. The conductive grit 50, in the preferred form of the present invention, is steel shot which is placed around the coils 30 and 32.

The first coil 30 has a central void 52 around which turns of wire 54 are arranged. In the preferred embodiment of the present invention, the wire 54 is superflex 600 volt insulated copper wire. Each of the first coil 30 and the second coil 34 have between 100 and 300 turns, inclusive, around the central voids 52 and 56, respectively. Cinch straps 58 serve to secure the coil 30 together around the central void 52. The coil 30 is dipped in glyptal and dried for 24 hours. Similarly, cinch straps 60 serve to secure the coil 34 together around the central void 56.

The first coil 30 has first lead 40 connected to a terminal 62. The second coil 34 has a first lead 44 connected to a terminal 64. Terminals 62 and 64 are arranged on wall 66 of enclosure 32. Within the concept of the present invention, the terminals 62 and 64 can emerge outwardly of walls 66 or can be placed interior of the wall 66. It is possible, within the concept of the present invention, that the cable 14 can extend into the interior of the enclosure 32 so as to be connected to the coils 30 and 32. The second lead 42 of coil 30 is connected to a terminal 68. The second lead 46 of the coil 34 is connected to a terminal 70. Terminals 68 and 70 are affixed to the wall 72 of the enclosure 32.

The enclosure 32 is a box formed of a polyvinyl chloride (PVC) material. In the preferred embodiment of the present invention, the enclosure 32 is eight inches wide by eight inches long and by four inches deep. As will be described hereinafter, a cover is positioned over the top surface of the enclosure 32. The conductive grit material 50 (shown in greater detail in FIG. 4) resides on the bottom of the enclosure 32. The coils 30 and 34 are located within the enclosure 32 upon the grit 50.

After the coils 30 and 34 are installed upon the layer of conductive grit, the remainder of the enclosure 32 is filled with another course steel grit to within one-half inch of the top of the enclosure 32. As can be seen in FIG. 2, holes 74, 76, 78 and 80 are formed in each of the walls of the enclosure 32. These holes 74, 76, 78 and 80 allow an expandable foam, such as polyurethane, to be injected into the interior of the enclosure 32 so as to extend around the conductive grit 50 and over and around the coils 30 and 34.

Figure 3:
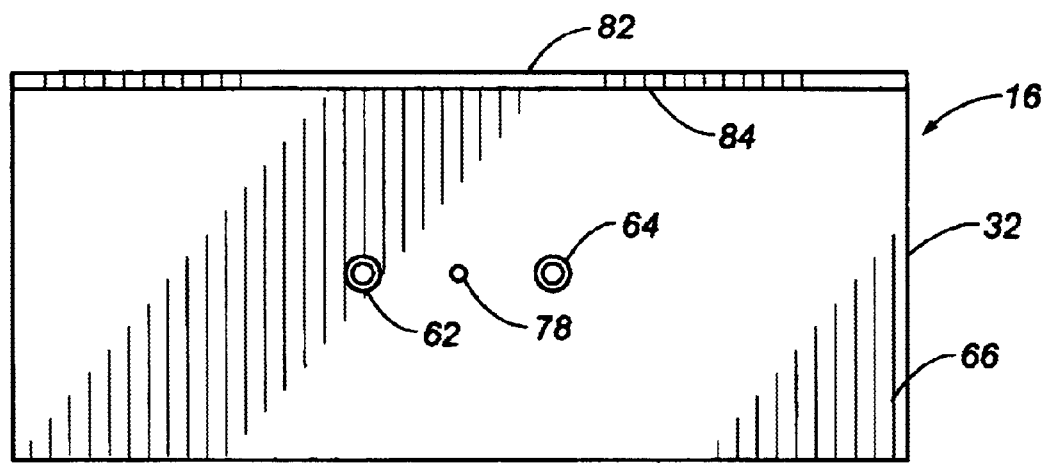
FIG. 3 is a side elevational view of the lightning suppression attenuator of the present invention.

FIG. 3 shows an exterior view of the enclosure 32 at side 66. As can be seen, a lid 82 is affixed onto the top opening 84 of the enclosure 32. In particular, the lid 82 can be screwed onto the top 84 of the enclosure 32 so as to securely seal the interior volume of the enclosure. The hole 78 allows the expandable foam to be injected into the interior of the enclosure 32. It can be seen that the terminals 62 and 64 are provided on the wall 66 so as to allow the first cable 14 to have its wires 22 and 24 connected to the respective coils 30 and 34. Suitable watertight connectors can be provided along with the terminals 62 and 64 so as to prevent liquid intrusion into the interior of the enclosure 32.

Figure 4:
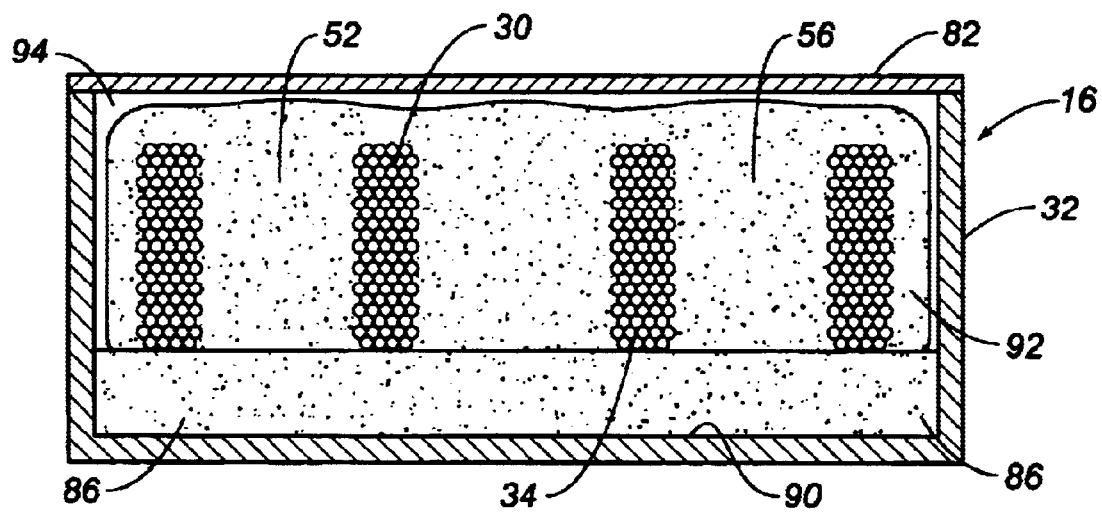
FIG. 4 is a cross-sectional view as taken across lines 4—4 of FIG. 1 showing the interior of the lightning suppression attenuator of the present invention.

Referring to FIG. 4, the interior configuration of the lightning suppression attenuator 16 is particularly illustrated. The enclosure 32 has lid 82 affixed thereover. The interior volume 86 includes a first layer 88 of coarse steel grit residing on the bottom 90 of the enclosure 32. The coils 30 and 34 are placed upon the top of the layer 88. Another layer 92 of coarse steel grit is then placed upon the first layer 88 and over and around the coils 30 and 34. The expandable foam material 94 will extend around the grit 92 and around the coils 30 and 34 so as to fully seal the coils 30 and 34 within the interior volume 86 of the enclosure 32.

In FIG. 4, it can be seen that the coils 30 and 34 have central voids 52 and 56 filled with the conductive grit 92.

FIG. 5 illustrates, in detail, the particular configuration of grounding rod 72 as used in the present invention. It can be seen that the grounding rod 72 has a central shaft 130 that extends from the pointed base 132 to the connection point 134. A plurality of spiral-shaped vanes 136 are positioned in spaced relationship longitudinally along the length of the shaft 130. Each of the spiral-shaped vanes 136 creates the "digging" action of the grounding rod 72. By rotating the grounding rod 72, the vanes 136 will engage the earth so as to draw the grounding rod 72 into the earth. The connection point 134 can be connected to a suitable rotational mechanism. After removal from the rotational mechanism, the connection point 134 can be used as the contact point for the electrical lines 104 or 106. As can be seen, the great surface area along each of the vanes 136 and along the shaft 130 establishes strong electrical connections between the grounding rod 72 and the earth. A carbon electrolyte can be placed over the surfaces of the grounding rod 72 so as to further establish a strong electrical connection.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

We claim:

1. A lightning suppression system comprising:
   an instrument
   a first cable having a first wire and a second wire, said cable being electrically connected to said instrument;
   an enclosure having an interior volume;
   a first coil positioned within said enclosure and electrically interconnected to said first wire;
   a second coil positioned within said enclosure and electrically interconnected to said second wire;
   an electronic device electrically interconnected by a second cable to said first and second coils; and
   a conductive grit filling a portion of said enclosure around said first and second coils, said conductive grit being steel shot.

2. The system of claim 1, each of said first and second coils having a central void with turns of wire extending around said central void.

3. The system of claim 1, said wire being superflex 600 volt insulated copper wire, each of said first and second coils having between 100 and 300 turns inclusive of wire around said central void.

4. The system of claim 1, further comprising:
   a grounding rod electrically connected by a conductive line to said enclosure.

5. The system of claim 4, said grounding rod comprising:
   a central shaft; and
   a plurality of vanes extending radially outwardly from said central shaft, said central shaft and said plurality of vanes being of a conductive material.

6. The system of claim 4, said conductive line being #10 copper wire.

7. The system of claim 1, first and second cables being of an identical structure.

8. The system of claim 1, said instrument being a monitoring device, said electronic device being a display.

9. The system of claim 1, said instrument being an actuator, said electronic device being a controller.

10. The system of claim 1, said second cable having a first wire electrically interconnected to said first coil, said second cable having a second wire electrically interconnected to said second coil.

11. A lightning suppression system comprising:
    an instrument;
    a first cable having a first wire and a second wire, said cable being electrically connected to said instrument;

an enclosure having an interior volume;

a first coil positioned within said enclosure and electrically interconnected to said first wire;

a second coil positioned within said enclosure and electrically interconnected to said second wire;

an electronic device electrically interconnected by a second cable to said first and second coils;

a conductive grit filling a portion of said enclosure around said first and second coils, and a rigid foam material affixed within said enclosure around said conductive grit and around said first and second coils.

12. A lightning suppression attenuator comprising:

an enclosure having an interior volume;

a first coil having terminals at opposite ends thereof a second coil having terminals at opposite ends thereof and a conductive grit filling a portion of said enclosure around said first and second coils, said conductive grit being steel shot.

13. The attenuator of claim 12, further comprising:

a grounding rod electrically connected by a conductive line to said enclosure.

14. The attenuator of claim 13, grounding rod comprising:

a central shaft; and a plurality of vanes extending radially outwardly from said central shaft, said central shaft and said plurality of vanes being of a conductive material.

15. The attenuator of claim 12, further comprising:

a first cable having a first wire connected to one of said terminals of said first coil and a second wire connected to one of said terminals of said second coil; and a second cable having a first wire connected to the other of said terminals of said first coil and a second wire connected to the other of said terminals of said second coil.

16. The attenuator of claim 12, each of said first and second coils having a central void with turns of wire extending around said central void.

17. The attenuator of claim 12, said wire being insulated copper wire, each of said first and second coils having between 100 and 300 turns inclusive of wire around said central void.

* * * * *